July 23, 1957 E. J. WINKLER 2,800,167
SPRING STRIP HAVING SOFT EDGE EXTENDING END
Filed Dec. 23, 1954
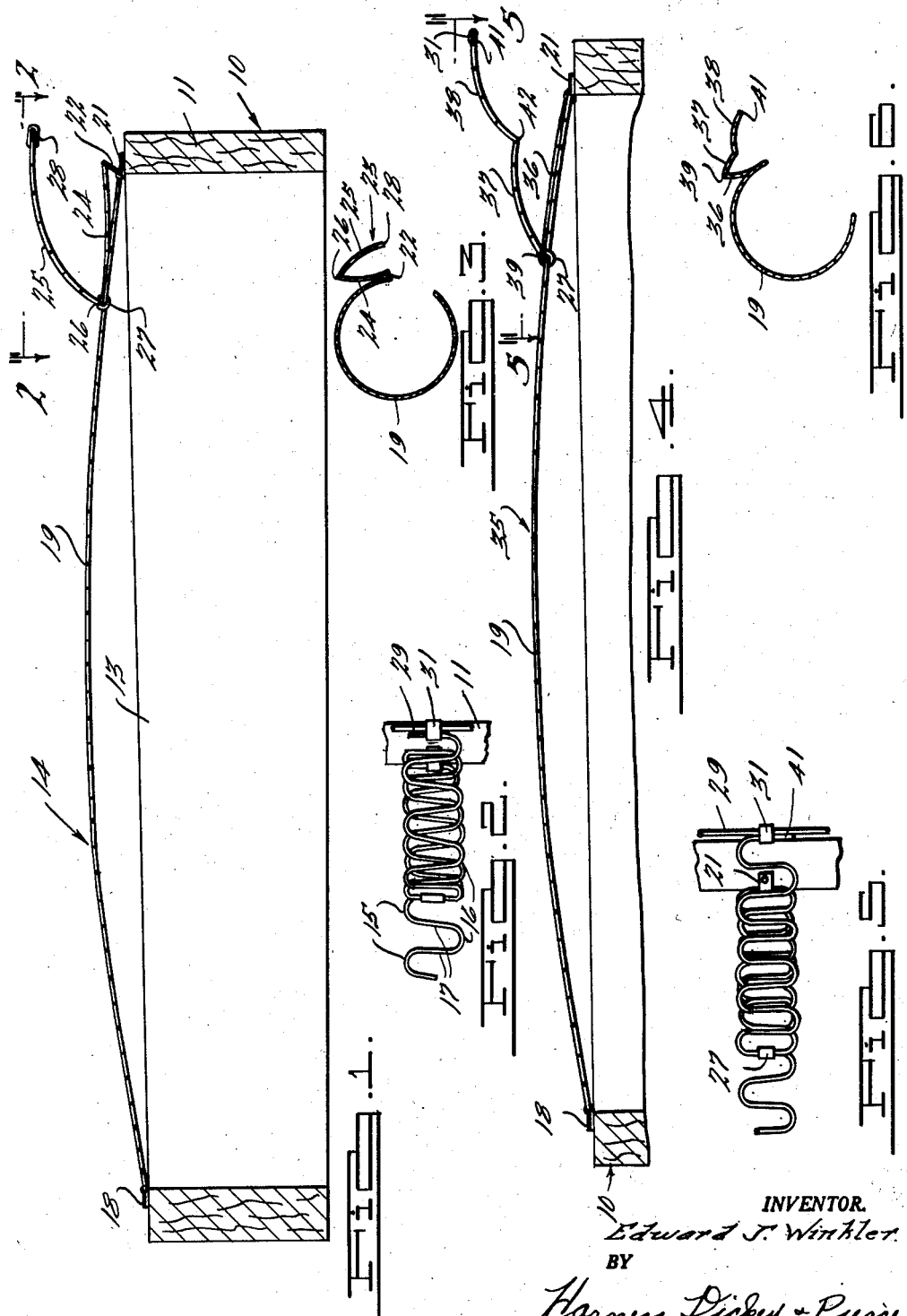
INVENTOR.
Edward J. Winkler
BY
Harness, Dickey & Pierce
ATTORNEYS.

United States Patent Office 2,800,167
Patented July 23, 1957

2,800,167

SPRING STRIP HAVING SOFT EDGE EXTENDING END

Edward J. Winkler, Detroit, Mich., assignor to No-Sag Spring Company, Warren Township, Macomb County, Mich., a corporation of Michigan Application December 23, 1954, Serial No. 477,208

8 Claims. (Cl. 155—179)

This invention relates to a spring construction, and particularly to a spring strip of sinuous formed wire having an end section formed thereon which provides a soft edge to the resulting cushion.

Difficulty has been experienced when constructing seat cushions from sinuous spring strips, since a soft edge is not provided when the ends are secured to the front and rear elements of a seat frame. Separate spring elements of different shapes and forms have been employed, secured to the top of the sinuous spring strips in a manner to have the forward end extend above the frame and thereby provide a soft edge therefor.

In the present arrangement, the forward edge of the load supporting portion of the spring strip is secured to the front frame element in the same manner as heretofore but the strip itself is so formed as to bend backwardly upon load supporting portions of the strip and to have a section extending upwardly and forwardly therefrom. This extends the outer end above the frame in a manner to control the degree of deflection and therefore provide a proper support and a soft edge at the front end of the assembly.

Accordingly, the main objects of the invention are: to form the load supporting portion of a spring strip on an arc and a V section in the strip on the outer surface of the arc at one end thereof which provides a soft edge to the front end of the load bearing section of the strip; to provide a strip with a load bearing section which is set on an arc to resist downward deflection when the ends are secured across a frame having at the forward end a V section which is bent backwardly over the outer portion of the arcuate section to provide a soft edge to the assembly, and, in general, to provide a spring strip which has a load bearing section and a section in extension thereof which provides a soft edge to the assembly when the load bearing sections are secured across the frame.

Other objects and features of novelty of the invention will be specifically pointed out or will become apparent when referring, for a better understanding of the invention, to the following description taken in conjunction with the accompanying drawing, wherein:

Figure 1 is a sectional view of a frame having a spring strip with a soft edge extension thereon, embodying features of the present invention;

Fig. 2 is a broken plan view of the front end of the strip illustrated in Fig. 1;

Fig. 3 is a reduced view of the spring strip after manufacture and before assembly;

Fig. 4 is a view of structure, similar to that illustrated in Fig. 1, showing a further form of the invention;

Fig. 5 is a broken plan view of the structure illustrated in Fig. 4, taken on the line 5—5 thereof, and Fig. 6 is a reduced view of the spring strip illustrated in Fig. 4 after manufacture and before assembly.

Referring to Figs. 1, 2 and 3, a seat frame 10 is illustrated embodying a front rail member 11 and a rear member 12 which are spaced apart to be disposed in parallel relation by end members 13. A spring strip 14 is made of wire bent back and forth to provide oppositely disposed loops 15 and 16 joined by straight portions 17 in the conventional manner. The rear end of the spring strip is secured to the rear frame member 12 by a suitable clip 18, while the forward end of the load bearing section 19 of the strip is secured to the front frame member 11 by a clip 21. Such an arrangement of a spring strip and its securement to the frame is conventional practice.

It will be noted from Figs. 1 and 3 that a section 22 comprising a loop 15 and a pair of straight sections 17 is bent at right angles from the forward end of the load bearing section 19 of the strip. The load bearing section is disposed on an arc of small radius to have the section resist downward deflection when the ends thereof are secured to the frame, as illustrated in Fig. 1. A V section 23 is bent rearwardly over the forward end of the load bearing section at right angles to the section 22. The V section 23 has one branch 24 which is reversely curved to the curve of the arcuate portion 19 and a second branch 25 which is reversely curved relative to the branch 24 and curved in the same manner as the arcuate portion 19. The entire length of the strip is formed on an arc of predetermined small radius, after which the section 22 is bent from the section 19 and the V section 23 is formed and bent from the section 22. After the load bearing section 19 has been secured to the frame 10 in the conventional manner, as pointed out hereinabove, the apex 26 of the V section 23 is secured to the adjacent portion of the load bearing section 19 by a clamping band 27. This positions the end 28 of the branch 25 of the V section 23 above the forward face of the frame element 11. After a plurality of the strips have been assembled in the frame, a border wire 29 is secured to the ends 28 of the branches 25 by suitable bands 31. In this manner all of the branches 25 will function in unison to provide the proper support at the front edge of the frame while permitting a desired amount of deflection.

In Figs. 4, 5 and 6, a similar type of spring 35 is illustrated having a load bearing portion 19, the rear and forward ends of which are secured to a frame 10 by suitable clips 18 and 21. The load supporting portion, as illustrated in Fig. 6, is of arcuate shape struck from a small radius to provide resistance against downward deflection when secured to the frame. The forward end of the strip has an extending branch 36 which is bent backwardly upon the outer surface of the load bearing section 19. A branch 37 is bent from the branch 36 disposed in V relation thereto, and this branch has a forward branch 38 extending upwardly and outwardly therefrom. It will be noted in this arrangement that the branches 36, 37 and 38 in continuation of the strip 19 are struck substantially on the same arc thereof so that the branch 36 will be disposed on an arc opposite to that of the load bearing section 19 and also to the branches 37 and 38. After the load bearing section has been assembled on the frame 10, the apex 39 between the branches 36 and 37 is secured to the load bearing section by a band 27. This disposes the end 41 of the branch 38 above the front face of the frame 10, spaced a substantial amount thereabove. After a plurality of the spring strips have been assembled in the frame, a border wire 29 is secured to the ends 41 of the branches 38 by bands 21. In this relationship, the deflection of the border wire will occur due to the bending of the section 37 from the apex 39 and the bending of the branch 38 from the point 42 at its junction with the branch 37. By varying the length of the branches 37 and 38 and the relationship between the branches 37 and 36, a load supported by the branch end 41 may be varied so as to provide the desired support and deflection to the soft front edge.

What is claimed is:

1. A spring made of wire bent back and forth in sinuous form having a load supporting portion of substantial length set on an arc of small radius and having a V-shaped portion reversely bent from one end of said load supporting portion and disposed on the outer side thereof, said V-shaped portion having one branch disposed adjacent to the load supporting portion and a second branch extending outwardly therefrom with the branches arched toward each other.

2. A spring made of wire bent back and forth in sinuous form having a load supporting portion of substantial length set on an arc of small radius and having a V-shaped portion reversely bent from one end of said load supporting portion and disposed on the outer side thereof, said V-shaped portion having one branch disposed adjacent to the load supporting portion and a second branch extending outwardly therefrom, said first branch being disposed on an arc reversely disposed to the arc of the load supporting portion and said second branch.

3. A spring made of wire bent back and forth in sinuous form having a load supporting portion of substantial length set on an arc of small radius and having a V-shaped portion reversely bent from one end of said load supporting portion and disposed on the outer side thereof; said V-shaped portion having one branch disposed adjacent to the load supporting portion and reversely arched relative thereto and a second branch extending outwardly therefrom, said second branch having an additional arcuately disposed portion bent from a first portion thereof.

4. In a seat construction, a frame having front and rear frame members, spring strips having load supporting portions disposed on an arc of small radius secured across their frame to the front and rear frame members, the front end of said spring strips having a V-shaped portion reversely bent back over the load supporting portion of the strips with the branch disposed adjacent to said portion arched in the opposite direction from the arc of the load supporting portion and the other branch arching in the same direction as said load supporting portion.

5. In a seat construction, a frame having front and rear frame members, spring strips having load supporting portions disposed on an arc of small radius secured across their frame to the front and rear frame members, the front end of said spring strips having a V-shaped portion reversely bent back over the load supporting portion of the strips to have one branch disposed adjacent to said portion and the other branch arching in the same direction as said load supporting portion and having a first arched portion and a second arched portion in extension thereof.

6. In a seat construction, a frame having front and rear frame members, spring strips having load supporting portions disposed on an arc of small radius secured across their frame to the front and rear frame members, the front end of said spring strips having a V-shaped portion reversely bent back over the load supporting portion of the strips to have one branch disposed adjacent to said portion and the other branch arching upwardly therefrom, said V-shaped portion being spaced from the forward end of said load supporting portion by a section of the strip disposed at substantially right angles thereto.

7. In a seat construction, a frame having front and rear frame members, spring strips having load supporting portions disposed on an arc of small radius secured across their frame to the front and rear frame members, the front end of said spring strips having a V-shaped portion reversely bent back over the load supporting portion of the strips to have one branch disposed adjacent to said portion and the other branch arching downwardly and extending upwardly therefrom, said upwardly extending branch having a first arched portion and a second arched portion extending upwardly therefrom, and a border wire joining the ends of the upwardly arched branches of the V-shaped portions to provide a continuous soft edge to the assembly.

8. In a seat construction, a frame having front and rear frame members, spring strips having load supporting portions disposed on an arc of small radius secured across their frame to the front and rear frame members, the front end of said spring strips having a V-shaped portion reversely bent back over the load supporting portion of the strips to have one branch disposed adjacent to said portion and the other branch arching upwardly therefrom, said V-shaped portion being spaced from the forward end of said load supporting portion by a section of the strip disposed at substantially right angles thereto, and a border wire joining the ends of the upwardly arched branches of the V-shaped portions to provide a continuous soft edge to the assembly.

References Cited in the file of this patent

UNITED STATES PATENTS 2,709,483   Weinberger _____ May 31, 1955

FOREIGN PATENTS 667,953   Great Britain _____ Mar. 12, 1952